US012013710B2

(12) United States Patent
Zhou et al.

(10) Patent No.: US 12,013,710 B2
(45) Date of Patent: Jun. 18, 2024

(54) VOLTAGE STABILIZING CIRCUIT AND DISPLAY PANEL

(71) Applicant: HKC CORPORATION LIMITED, Shenzhen (CN)

(72) Inventors: Renjie Zhou, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/068,326

(22) Filed: Dec. 19, 2022

(65) Prior Publication Data

US 2024/0069584 A1 Feb. 29, 2024

(30) Foreign Application Priority Data

Aug. 29, 2022 (CN) ........................ 202211050613.7

(51) Int. Cl.
*G05F 1/59* (2006.01)
*G09G 3/32* (2016.01)

(52) U.S. Cl.
CPC ................ *G05F 1/59* (2013.01); *G09G 3/32* (2013.01); *G09G 2300/0819* (2013.01); *G09G 2300/0842* (2013.01); *G09G 2310/0289* (2013.01)

(58) Field of Classification Search
CPC .... G05F 1/59; G09G 3/32; G09G 2300/0819; G09G 2300/0842
See application file for complete search history.

(56) References Cited

U.S. PATENT DOCUMENTS

| | | | | |
|---|---|---|---|---|
| 2008/0169822 | A1 | 7/2008 | Kwak | |
| 2015/0042232 | A1 | 2/2015 | Yamamoto et al. | |
| 2017/0039935 | A1 | 2/2017 | Yang et al. | |
| 2020/0260030 | A1 | 8/2020 | Sakakibara | |
| 2020/0302863 | A1* | 9/2020 | Xuan .................. | G09G 3/3233 |

FOREIGN PATENT DOCUMENTS

| | | | |
|---|---|---|---|
| CN | 1627350 | A | 6/2005 |
| CN | 105741777 | A | 7/2016 |
| CN | 107731186 | A | 2/2018 |
| CN | 108711400 | A | 10/2018 |

(Continued)

OTHER PUBLICATIONS

First Office Action issued in counterpart Chinese Patent Application No. 202211050613.7, dated Jun. 25, 2023.

(Continued)

*Primary Examiner* — Kenneth B Lee, Jr.
(74) *Attorney, Agent, or Firm* — Westbridge IP LLC

(57) ABSTRACT

Disclosed are a voltage stabilizing circuit and a display panel. A voltage stabilizing circuit includes a light emitting module, a driving module, a comparison module, a selection module, a first switch module and a second switch module. Since the delay of on-off of each LED in the display panel is difficult to be detected by the eyes, the present application combines the above modules, can change the on-off timing of the LED in the entire display panel by setting the reference voltage as the judgment threshold of the driving voltage, to provide more ample time for the driving voltage of the remote end to climb or fall, to turn the LED on and light it up until the driving voltage meets the conditions.

7 Claims, 2 Drawing Sheets

(56) References Cited

FOREIGN PATENT DOCUMENTS

| | | | | |
|---|---|---|---|---|
| CN | 109410878 | A | | 3/2019 |
| CN | 209015703 | U | | 6/2019 |
| CN | 112992092 | A | | 6/2021 |
| CN | 114387931 | A | | 4/2022 |
| CN | 114550656 | A | | 5/2022 |
| CN | 114566124 | A | | 5/2022 |
| CN | 114783352 | A | | 7/2022 |
| CN | 114783381 | A | | 7/2022 |
| CN | 114822402 | A | | 7/2022 |
| CN | 114863879 | A | | 8/2022 |
| CN | 114863879 | A | * | 8/2022 |
| CN | 115294923 | A | | 11/2022 |
| KR | 20080112621 | A | | 12/2008 |

OTHER PUBLICATIONS

International Search Report and Written Opinion issued in counterpart PCT Application No. PCT/CN2022/142430, dated Mar. 21, 2023.

Grant Notification issued in counterpart Chinese Patent Application No. 202211050613.7, dated Sep. 7, 2023.

* cited by examiner

VOLTAGE STABILIZING CIRCUIT AND DISPLAY PANEL

CROSS-REFERENCE TO RELATED APPLICATIONS

This application claims priority to Chinese Patent Application No. 202211050613.7, filed on Aug. 29, 2022, the contents of which are incorporated herein by reference in its entirety.

TECHNICAL FIELD

The present application relates to the display technical field, in particular to a voltage stabilizing circuit and a display panel.

BACKGROUND

In the related art, due to different distances from a data line to a near end and a far end of the display panel, a driving voltage Vdd of the micro-light emitting diode (LED) may have different climbing speeds at the near end and the far end of the display panel, resulting in inconsistent performance of the near end and the far end of the display panel. For example, when starting up, the Vdd in the panel may not climb stably, which may cause the screen to flicker. For another example, when the power is turned off, the Vdd in the panel may drop unstably, causing the screen to flicker.

SUMMARY

The main purpose of the present application is to provide a voltage stabilizing circuit and a display panel, which aims to solve the technical problem of how to make the performance of micro-LED at the near end and the far end of the display panel consistent, to avoid the screen flicker of the display panel.

In order to achieve the above purpose, the present application also provides a voltage stabilizing circuit, including:

a light emitting module;

a driving module connected to a scan signal and a driving voltage, and configured to provide the driving voltage to the light emitting module under a control of the scan signal;

a comparison module connected to the driving module, and connected to the driving voltage and a reference voltage, and configured to compare the driving voltage to the reference voltage and generate an output signal;

a selection module connected to the comparison module, and connected to a positive high voltage and a negative low voltage, and configured to output the positive high voltage or the negative low voltage under a control of the output signal;

a first switch module connected to the light emitting module, the driving module and the selection module, and configured to conduct a circuit between the driving module and the light emitting module under a control of the positive high voltage, or to turn off a circuit between the driving module and the light emitting module under a control of the negative low voltage; and a second switch module connected to the driving module, the first switch module and the selection module, and connected to a data voltage, and configured to output the data voltage to the driving module under the control of the positive high voltage, or prevent the data voltage from entering the driving module under the control of the negative low voltage.

In one embodiment, the light emitting module includes: a light emitting device, in particular an anode end of the light emitting device is connected to the first switch module, and a cathode end of the light emitting device is electrically connected to a common ground.

In one embodiment, the driving module includes: a first transistor, a second transistor and a capacitance;

in particular a gate of the first transistor receives a scan signal, and a source of the first transistor is connected to the second switch module;

a gate of the second transistor is connected to a drain of the first transistor, a source of the second transistor is connected to the first switch module, and a drain of the second transistor is connected to the driving voltage; and an end of the capacitance is connected to the drain of the first transistor and the gate of the second transistor, and another end of the capacitance is connected to the source of the second transistor and the switch module.

In one embodiment, the comparison module includes: a voltage comparator, in particular an in-phase input end of the voltage comparator is connected to the driving voltage, a reverse phase input end of the voltage comparator is connected to the reference voltage, and an output end of the voltage comparator is connected to the selection module.

In one embodiment, the selection module includes: a third transistor and a fourth transistor, in particular a gate of the third transistor is connected to an output end of the voltage comparator, a source of the third transistor is connected to the negative low voltage, and a drain of the third transistor is connected to the first switch module and the second switch module; and a gate of the fourth transistor is connected to the output end of the voltage comparator, a source of the fourth transistor is connected to the positive high voltage, and a drain of the fourth transistor is connected to the first switch module and the second switch module.

In one embodiment, the first switch module includes: a fifth transistor, in particular a gate of the fifth transistor is connected to the drain of the third transistor and the drain of the fourth transistor, a source of the fifth transistor is connected to the source of the second transistor and another end of the capacitor, and a drain of the fifth transistor is connected to an anode end of the light emitting device.

In one embodiment, the second switch module includes: a sixth transistor, in particular a gate of the sixth transistor is connected to the drain of the third transistor, the drain of the fourth transistor and the gate of the fifth transistor, a source of the sixth transistor is connected to the data voltage, and a drain of the sixth transistor is connected to the source of the first transistor.

In one embodiment, the scan signal is high level, the first transistor is turned on, the driving voltage is less than the reference voltage, the voltage comparator outputs a low level, the third transistor is turned on, the fourth transistor is turned off, the selection module outputs a negative low voltage, the fifth transistor is turned off, and the sixth transistor is turned off, the second transistor is turned off, and the light emitting device is turned off.

In one embodiment, the scan signal is high level, the first transistor is turned on, the driving voltage is greater than the reference voltage, the voltage comparator outputs a high level, the third transistor is turned off, the fourth transistor is turned on, the selection module outputs a positive high voltage, the fifth transistor is turned on, and the sixth transistor is turned on, the second transistor is turned on, and the light emitting device is turned on to emit light.

In addition, to realize the purpose above, the present application provides a display panel including a voltage stabilizing circuit above.

The present application provides a voltage stabilizing circuit and a display panel. The present application optimizes the driving circuit of micro-LED to obtain a voltage stabilizing circuit. The stabilizing circuit includes: a light emitting module, a driving module, a comparison module, a selection module, a first switch module and a second switch module. Since a delay of turning on and turning off of micro-LED in the display panel is difficult to be detected by the naked eye. The present application combines the above modules, the on-off timing of micro-LED in the entire display panel can be changed by setting the reference voltage as a judgment threshold of the driving voltage, to provide more ample time for the remote driving voltage to climb or fall, until the driving voltage meets the conditions, the micro-LED turn on and light up, to avoid the situation that micro-LED lights up gradually from micro luminescence when the driving voltage amplitude is not enough, to effectively avoid the problem that the screen flickers when the machine is turned on and turned off.

In addition, on the basis of the voltage stabilizing circuit, it only needs to fine tune some input parameters, and it can further realize an overvoltage protection function. It can turn off a LED when its voltage is abnormal, and then turn it on when its voltage returns to normal, to realize the precise control of a single LED, and has a flexible protection role in the working process of the display panel, to avoid the technical defect that the traditional overvoltage protection needs to disable the whole display panel.

BRIEF DESCRIPTION OF THE DRAWINGS

In order to more clearly illustrate the technical solutions in the embodiments of the present application or in the related art, the following briefly introduces drawings in the description of the embodiments or the related art. Obviously, the drawings in the following description are only some embodiments of the present application. Other drawings can further be obtained for those skilled in the art according to the structure shown in these drawings, without creative labor.

The realization, functional features and advantages of the present application will be further described with reference to the drawings in combination with the embodiments.

DETAILED DESCRIPTION OF THE EMBODIMENTS

It should be understood that the specific embodiments described here are only used to explain the present application, not to define the present application.

Figure 1:
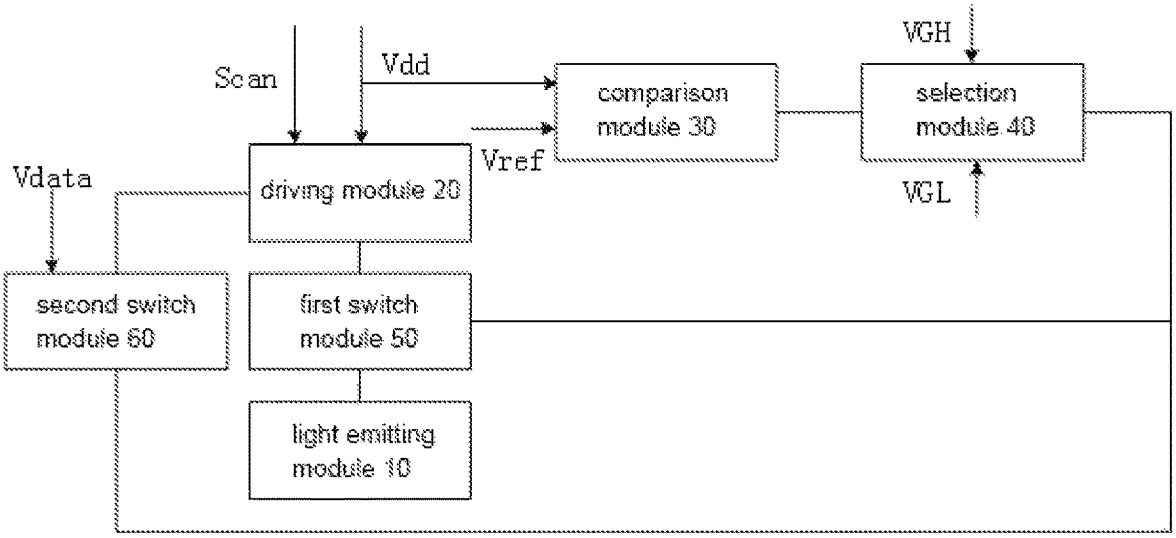
FIG. 1 is a functional module diagram of the voltage stabilizing circuit according to an embodiment of the present application.

The embodiment of the present application provides a voltage stabilizing circuit. According to FIG. 1, which is the functional module diagram of a voltage stabilizing circuit according to the embodiment of the present application.

In the embodiment, the voltage stabilizing circuit includes:

a light emitting module 10;

a driving module 20 connected to a scan signal Scan and a driving voltage Vdd, and provided the driving voltage Vdd to the light emitting module 10 under a control of the scan signal Scan;

a comparison module 30 connected to the driving module 20, and connected to the driving voltage Vdd and the reference voltage Vref, and configured to compare the driving voltage Vdd to the reference voltage Vref and generate an output signal;

a selection module 40 connected to the comparison module 30, connected to a positive high voltage VGH and a negative low voltage VGL, and configured to output a positive high voltage VGH or a negative low voltage VGL under a control of the output signal;

a first switch module 50 connected to the light emitting module 10, the driving module 20 and the selection module 40, configured to conduct the circuit connection between the driving module 20 and the light emitting module 10 under the control of the positive high voltage VGH, or to turn off a circuit between the driving module 20 and the light emitting module 10 under the control of the negative low voltage VGL;

a second switch module 60 connected to the driving module 20, the first switch module 50 and the selection module 40. The second switch module 60 is connected to the data voltage Vdata. The second switch module 60 is configured to output the data voltage Vdata to the driving module 20 under the control of the positive high voltage VGH, or prevent the data voltage Vdata from entering the driving module 20 under the control of the negative low voltage VGL.

It should be noted that the voltage stabilizing circuit provided by the embodiment is set based on the number of micro-LED in the display panel, that is, each micro-LED has its corresponding voltage stabilizing circuit, in which the micro-LED at the near end can also not be set, but the remote micro-LED must be set with the voltage stabilizing circuit, the data voltage Vdata is from the data line, the reference voltage Vref can be from the register of the control chip, the scan signal Scan, the positive high voltage VGH and the negative low voltage VGL can come from the scan line.

Figure 2:
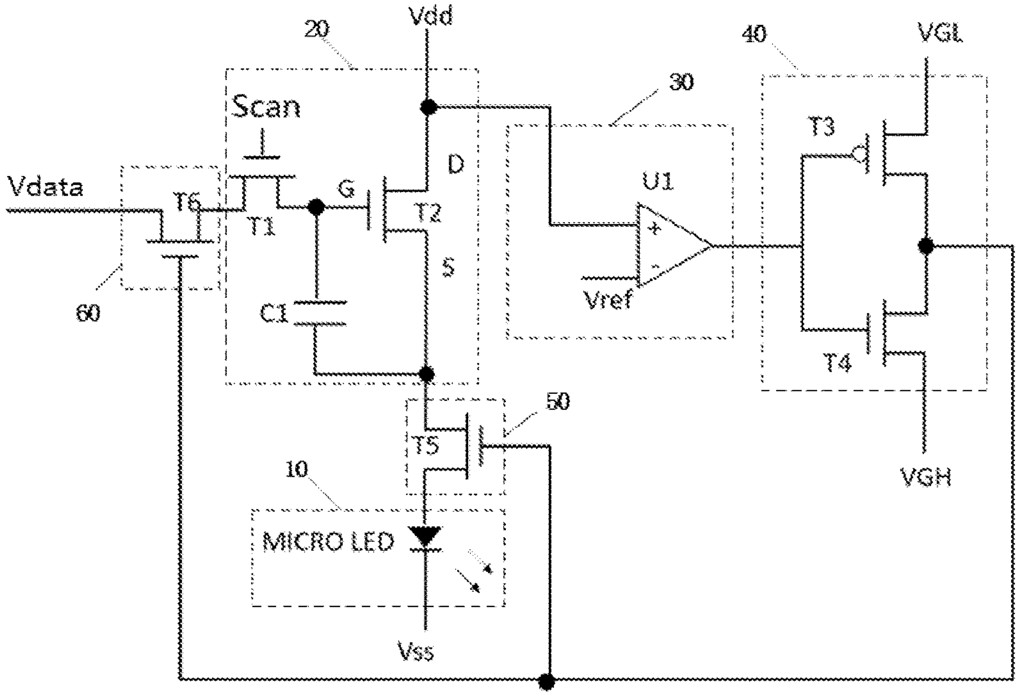
FIG. 2 is a schematic structural view of the voltage stabilizing circuit according to another embodiment of the present application.

Further, according to FIG. 2, FIG. 2 is the circuit structure diagram of a voltage stabilizing circuit according to an embodiment of the present application.

According to FIG. 2, in some embodiments, the light emitting module 10 includes:

a light emitting device micro-LED, connected to the first switch module 50, a cathode end of the light emitting device micro-LED is electrically connected to the common ground terminal Vss, and the light emitting device micro-LED can be a miniature light emitting diode.

In some embodiments, the driving module 20 includes: a first transistor T1, a second transistor T2, and a capacitor C1.

The first transistor T1 is connected to the scan signal Scan, and a source of the first transistor T1 is connected to the second switch module 60;

A gate of the second transistor T2 is connected to a drain of the first transistor T1, a source of the second transistor T2 is connected to the first switch module 50, and a drain of the second transistor T2 is connected to the driving voltage Vdd;

One end of the capacitor C1 is connected to the drain of the first transistor T1 and the gate of the second transistor T2, and another end of the capacitor C1 is connected to the source of the second transistor T2 and the switch module.

In some embodiments, the comparison module 30 includes: a voltage comparator U1, an in-phase input end of the voltage comparator U1 is connected to the driving voltage Vdd, the reverse phase input end of the voltage comparator U1 is connected to the reference voltage Vref, and an output end of the voltage comparator U1 is connected to the selection module 40.

In some embodiments, the selection module 40 includes:

a third transistor T3, a gate of which is connected to the output end of the voltage comparator U1, a source of which is connected to the negative low voltage VGL, and a drain of which is connected to the first switch module 50 and the second switch module 60;

a fourth transistor T4, the gate of which is connected to the output end of the voltage comparator U1, a source of which is connected to the positive high voltage VGH, and a drain of which is connected to the first switch module 50 and the second switch module 60.

It can be understood that the gate of the third transistor T3 and the gate of the fourth transistor T4 together form the input end of the selection module 40, and the drain of the third transistor T3 and the drain of the fourth transistor T4 together form the output end of the selection module 40.

It should be noted that the access voltages of the in-phase input terminal and the reverse phase input terminal of the voltage comparator U1 are exchanged, and at the same time, the access voltages of respective sources of T3 and T4 are exchanged. Such ways are equivalent to the circuit provided in this embodiment and also belongs to the scope of the embodiment.

In some embodiments, the first switch module 50 includes: a fifth transistor T5.

A gate of fifth transistor T5 is connected to the drain of the third transistor T3 and the drain of the fourth transistor T4, the source of fifth transistor T5 is connected to the source of the second transistor T2 and another end of the capacitor C1, and a drain of fifth transistor T5 is connected to an anode end of the light emitting device micro-LED.

In some embodiments, the second switch module 60 includes: a sixth transistor T6.

A gate of sixth transistor T6 is connected to the drain of the third transistor T3, the drain of the fourth transistor T4 and the gate of the fifth transistor T5, a source of the sixth transistor T6 is connected to the data voltage Vdata, and the drain of the sixth transistor T6 is connected to the source of the first transistor T1.

It should be noted that the transistors used in all embodiments of the present application can be a thin film transistor (TFT), FET or other devices with the same characteristics. Since the source and drain electrodes of the transistors configured here are symmetrical, their source and drain electrodes can be interchanged. In the embodiment of the present application, in order to distinguish the two electrodes of the transistor except the gate, one of two electrodes is called the source and the other is called the drain. In this embodiment, the second transistor T2 operates in the amplification area, and other transistors operate in a cut-off area or a saturation area. In FIG. 2, characteristics of each port of the second transistor T2 can be determined according to the G, D, and S marks in the FIG. 2, G is a gate of T2, S is a source of T2, and D is a drain of T2, while the other transistors can be specified according to a shape in FIG. 2. A middle end of each transistor is the gate, a signal input end of each transistor is the source, and a signal output end of each transistor is the drain.

In addition, the transistors in the embodiments of the present application can include P-type transistors and/or N-type transistors. The P-type transistors are turned on at a low grid level, the N-type transistors are turned on at a high grid level, and the N-type transistors are turned on at the high grid level, and the N-type transistors are turned off at the low grid level.

In some embodiments, the first transistor T1, the second transistor T2, the third transistor T3, the fourth transistor T4, the fifth transistor T5, and the sixth transistor T6 can be low-temperature polysilicon thin film transistors, oxide semiconductor thin film transistors, or amorphous silicon thin film transistors. The transistors in the drive circuit provided by the embodiment of the present application are transistors of same materials, to avoid the influence of the differences among transistors of different materials on the drive circuit.

Furthermore, in some embodiments, when the scan signal Scan is at a high level, the first transistor T1 is turned on. If the driving voltage Vdd is less than the reference voltage Vref, the voltage comparator U1 outputs a low level, the third transistor T3 is turned on, the fourth transistor T4 is turned off, the selection module 40 outputs a negative low voltage VGL, the fifth transistor T5 is turned off, and the sixth transistor T6 is turned off, the second transistor T2 is turned off, and the light emitting device micro-LED is turned off and not emitting light.

In some embodiments, when the scan signal Scan is high level, the first transistor T1 is turned on. If the driving voltage Vdd is greater than the reference voltage Vref, the voltage comparator U1 outputs a high level, the third transistor T3 is turned off, the fourth transistor T4 is turned on, the selection module 40 outputs a positive high voltage VGH, the fifth transistor T5 is turned on, the sixth transistor T6 is turned on, the second transistor T2 is turned on, and the light emitting device micro-LED is turned on to emit light.

It should be noted that in this embodiment, Vref is set to be less than Vdd and close to Vdd, and the voltage is basically stable when Vdd reaches Vref. When starting up, the U1 voltage comparator outputs a high level when Vdd is greater than Vref. When starting up, if Vdd is less than Vref, U1 outputs a low level, and at this time, T3 is turned on and T4 is turned off. The selection module 40 outputs VGL to control T5 and T6 to be turned off. The current generated by Vdd at this stage cannot reach the micro-LED, and the driving voltage Vdata cannot reach T2. When Vdd is greater than Vref, the Vdd current has an opportunity to reach the micro-LED to turn it on and light it up, to avoid the problem of screen flicker during turning on. When shutting down, as long as Vdd is powered down to be less than Vref, U1 will output a low level, to turn T3 on and turn T4 off, thus the selection module 40 outputs VGL to control T5 and T6 to be turned off, the micro-LED will be completely isolated from Vdd. Therefore, no matter how the waveform of Vdd changes, the light emitting state of micro-LED will not be affected, to avoid the problem of screen flicker during the shutdown phase.

The present application provides a voltage stabilizing circuit. The present application optimizes the driving circuit of micro-LED to obtain a voltage stabilizing circuit. The stabilizing circuit includes: a light emitting module, a driving module, a comparison module, a selection module, a first switch module and a second switch module. Since a delay of turning on and turning off of micro-LED in the display panel is difficult to be detected by the naked eye. The present application combines the above modules, the on-off timing of micro-LED in the entire display panel can be changed by setting the reference voltage as a judgment threshold of the driving voltage, to provide more ample time for the remote driving voltage to climb or fall, until the driving voltage meets the conditions, the micro-LED turn on and light up, to avoid the situation that micro-LED lights up gradually from micro luminescence when the driving voltage amplitude is not enough, to effectively avoid the problem that the screen flickers when the machine is turned on and turned off.

Figure 3:
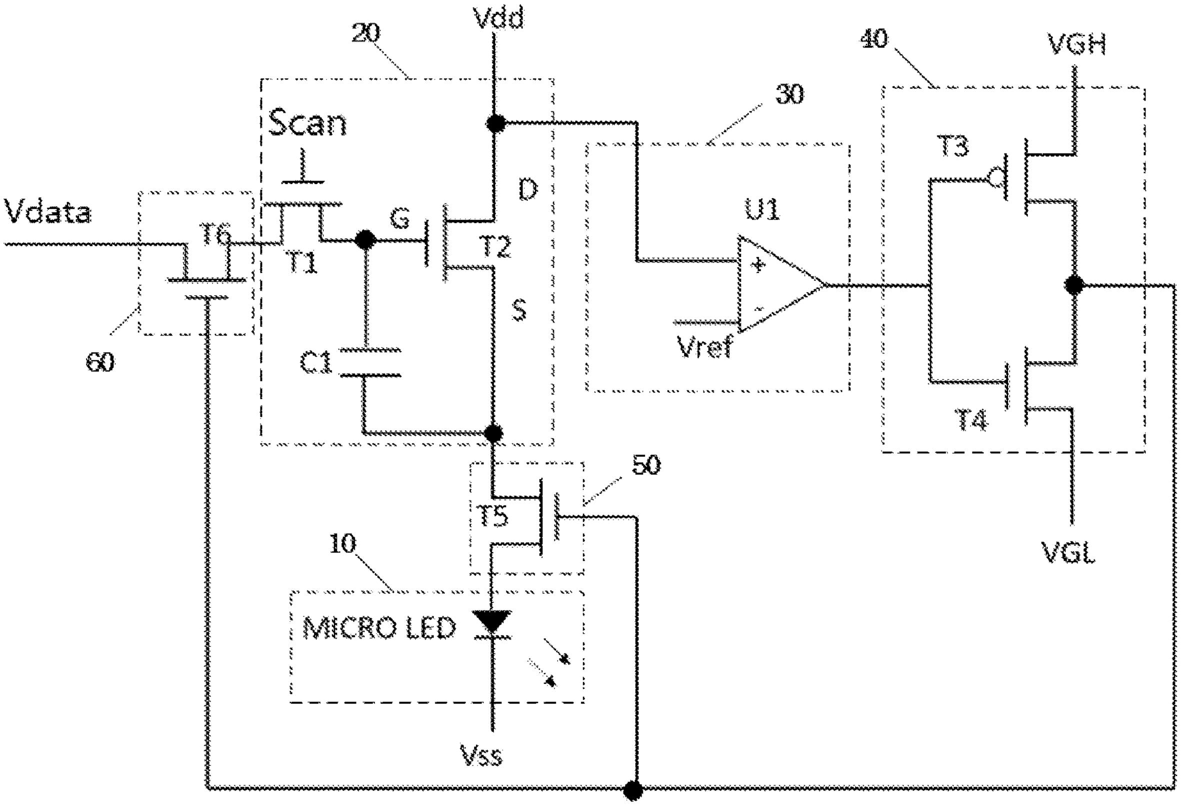
FIG. 3 is a schematic structural view of the voltage stabilizing circuit according to another embodiment of the present application.

In addition, according to FIG. 3, FIG. 3 is a schematic structural view of the voltage stabilizing circuit according to another embodiment of the present application.

It should be noted that the difference between FIG. 3 and FIG. 2 only is that the access positions of VGH and VGL are exchanged. In the embodiment, a reference voltage Vref greater than the driving voltage Vdd is set. When the driving voltage Vdd has an overvoltage, T3 is turned off and T4 is turned on. At this time, the selection module 40 outputs VGL and controls T5 and T6 to be turned off, to ensure that no current flows through the LED. At the same time, if such circuit is applied to each LED, only one LED will be turned off in case of overvoltage. Visually, if the number of LED being turned off is small, it cannot be found by the eyes. When the voltage returns to normal, the LED can return to normal operation. This overvoltage protection mode will not extinguish the entire display panel, and has the function of flexible protection.

The embodiment provides a voltage stabilizing circuit, which provides an overvoltage protection function for micro-LED. It can turn off the LED when its voltage is abnormal, and turn it on when its voltage returns to normal, to precisely control a single LED, and has the function of flexible protection role when the display panel works, to avoid the technical defect that the traditional overvoltage protection needs to disable the whole display panel.

In addition, the embodiment of the present application further proposes a display panel, which includes the voltage stabilizing circuit as described above, according to FIG. 4, which is the schematic structural view of the display panel according to the embodiment of the present application.

Figure 4:
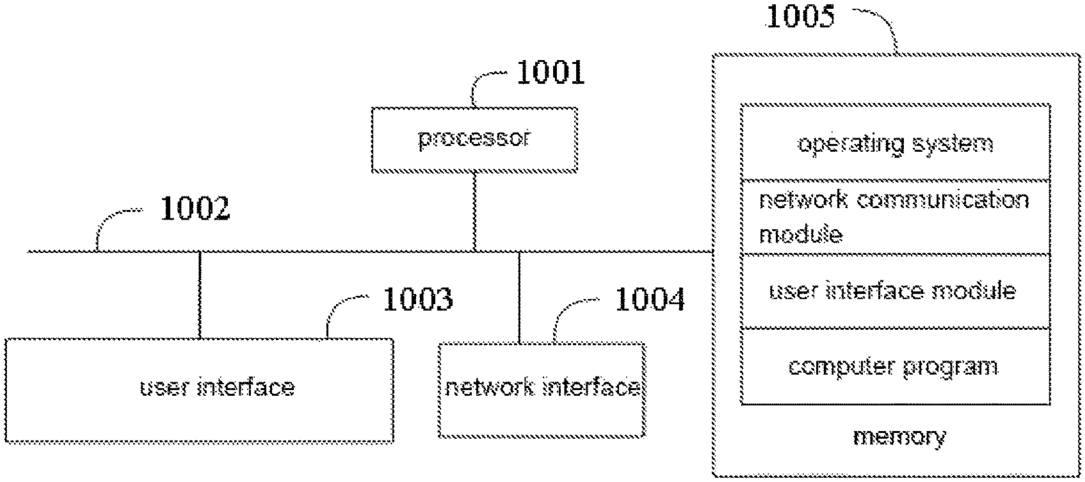
FIG. 4 is a schematic structural view of the display panel according to the embodiment of the present application.

According to FIG. 4, the display panel can include: a processor 1001, such as a central processing unit (CPU), a communication bus 1002, a user interface 1003, a network interface 1004, and a memory 1005. The communication bus 1002 is configured to realize connection communication among these components. The user interface 1003 may include a display screen, an input unit such as a keyboard. The user interface 1003 may further include a standard wired interface and a wireless interface. The network interface 1004 can include a standard wired interface and a wireless interface (such as wireless fidelity (WI-FI) interface). The memory 1005 can be a high-speed random access memory (RAM) or a stable non-volatile memory (NVM), such as a disk memory. The memory 1005 may be a storage device independent of the processor 1001 described above.

Those skilled in the art can understand that the structure according to FIG. 4 does not constitute a definition of the display panel, and may include more or fewer components than shown in the figures, or combination of some components, or different component arrangements.

According to FIG. 4, the memory 1005 as a storage medium can include an operating system, a data storage module, a network communication module, a user interface module, and a computer program.

In the display panel according to the FIG. 4, the network interface 1004 is mainly configured for data communication with other devices. The user interface 1003 is mainly configured for data interaction with users. The processor 1001 and memory 1005 in the embodiment can be set in the display panel, which invokes the computer program stored in the memory 1005 through the processor 1001 and controls the voltage stabilizing circuit.

Each embodiment of the display panel of the present application can refer to each embodiment of the voltage stabilizing circuit of the present application, which will not be repeated here.

It should be noted that herein the terms "include", "comprise" or any other variant thereof are intended to cover nonexclusive inclusion, so that a process, a method, an article or a system that includes a series of elements not only includes those elements, but also includes other elements that are not explicitly listed, or also includes elements inherent in such process, method, article or system. Without more restrictions, the element defined by the statement "including one . . . " does not exclude the existence of another identical element in the process, method, article or system that includes the element.

The serial number of the embodiments of the present application is only for description and does not represent the advantages and disadvantages of the embodiments.

Through the above description of the embodiments, those skilled in the art can clearly understand that the above embodiments can be implemented by means of software plus the necessary general hardware platform, or by the hardware, but in many cases, the former is a better implementation. Based on this understanding, the technical solution of the present application in essence or the part that contributes to the prior art can be embodied by a software product, which is stored in a storage medium (such as ROM/RAM, a magnetic disc, an optical disc) as described above, and includes a plurality of instructions to enable a terminal device (which can be a mobile phone, a computer, a server, an air conditioner, or a network device) to execute the methods described in various embodiments of the present application.

The above is only an embodiment of the present application, and does not limit the scope of the present application. Any equivalent structure or equivalent process transformation made by using the description and the drawings of the present application, or direct or indirect application in other related technical fields, fall within the scope of the present application.

What is claimed is:

1. A voltage stabilizing circuit, comprising:

a light emitting module;

a driving module connected to a scan signal and a driving voltage, and configured to provide the driving voltage to the light emitting module under a control of the scan signal;

a comparison module connected to the driving module, and connected to the driving voltage and a reference voltage, and configured to compare the driving voltage to the reference voltage and generate an output signal;

a selection module connected to the comparison module, and connected to a positive high voltage and a negative low voltage, and configured to output the positive high voltage or the negative low voltage under a control of the output signal;

a first switch module connected to the light emitting module, the driving module and the selection module, and configured to conduct a circuit between the driving module and the light emitting module under a control of the positive high voltage, or to turn off a circuit between the driving module and the light emitting module under a control of the negative low voltage; and a second switch module connected to the driving module, the first switch module and the selection module, and connected to a data voltage, and configured to output the data voltage to the driving module under the control of the positive high voltage, or prevent the data voltage from entering the driving module under the control of the negative low voltage, wherein:

the light emitting module comprises a light emitting device, an anode end of the light emitting device is connected to the first switch module, and a cathode end of the light emitting device is electrically connected to a common ground;

the driving module comprises a first transistor, a second transistor and a capacitance; a gate of the first transistor receives a scan signal, and a source of the first transistor is connected to the second switch module;

a gate of the second transistor is connected to a drain of the first transistor, a source of the second transistor is connected to the first switch module, and a drain of the second transistor is connected to the driving voltage;

an end of the capacitance is connected to the drain of the first transistor and the gate of the second transistor, and another end of the capacitance is connected to the source of the second transistor and the switch module;

the comparison module comprises a voltage comparator, an in-phase input end of the voltage comparator is connected to the driving voltage, a reverse phase input end of the voltage comparator is connected to the reference voltage, and an output end of the voltage comparator is connected to the selection module;

the selection module comprises a third transistor and a fourth transistor, a gate of the third transistor is connected to an output end of the voltage comparator, a source of the third transistor is connected to the negative low voltage, and a drain of the third transistor is connected to the first switch module and the second switch module; and a gate of the fourth transistor is connected to the output end of the voltage comparator, a source of the fourth transistor is connected to the positive high voltage, and a drain of the fourth transistor is connected to the first switch module and the second switch module.

2. The voltage stabilizing circuit according to claim 1, wherein the first switch module comprises: a fifth transistor, wherein a gate of the fifth transistor is connected to the drain of the third transistor and the drain of the fourth transistor, a source of the fifth transistor is connected to the source of the second transistor and another end of the capacitor, and a drain of the fifth transistor is connected to an anode end of the light emitting device.

3. The voltage stabilizing circuit according to claim 2, wherein the second switch module comprises: a sixth transistor, wherein a gate of the sixth transistor is connected to the drain of the third transistor, the drain of the fourth transistor and the gate of the fifth transistor, a source of the sixth transistor is connected to the data voltage, and a drain of the sixth transistor is connected to the source of the first transistor.

4. The voltage stabilizing circuit according to claim 3, wherein the scan signal is high level, the first transistor is turned on, the driving voltage is less than the reference voltage, the voltage comparator outputs a low level, the third transistor is turned on, the fourth transistor is turned off, the selection module outputs a negative low voltage, the fifth transistor is turned off, and the sixth transistor is turned off, the second transistor is turned off, and the light emitting device is turned off.

5. The voltage stabilizing circuit according to claim 4, wherein the scan signal is high level, the first transistor is turned on, the driving voltage is greater than the reference voltage, the voltage comparator outputs a high level, the third transistor is turned off, the fourth transistor is turned on, the selection module outputs a positive high voltage, the fifth transistor is turned on, and the sixth transistor is turned on, the second transistor is turned on, and the light emitting device is turned on to emit light.

6. A display panel, comprising a voltage stabilizing circuit, wherein the voltage stabilizing circuit comprises:

a light emitting module;

a driving module connected to a scan signal and a driving voltage, and configured to provide the driving voltage to the light emitting module under a control of the scan signal;

a comparison module connected to the driving module, and connected to the driving voltage and a reference voltage, and configured to compare the driving voltage to the reference voltage and generate an output signal;

a selection module connected to the comparison module, and connected to a positive high voltage and a negative low voltage, and configured to output the positive high voltage or the negative low voltage under a control of the output signal;

a first switch module connected to the light emitting module, the driving module and the selection module, and configured to conduct a circuit between the driving module and the light emitting module under a control of the positive high voltage, or to turn off a circuit between the driving module and the light emitting module under a control of the negative low voltage; and a second switch module connected to the driving module, the first switch module and the selection module, and connected to a data voltage, and configured to output the data voltage to the driving module under the control of the positive high voltage, or prevent the data voltage from entering the driving module under the control of the negative low voltage, wherein:

the light emitting module comprises: a light emitting device, an anode end of the light emitting device is connected to the first switch module, and a cathode end of the light emitting device is electrically connected to a common ground;

the driving module comprises a first transistor, a second transistor and a capacitance;

a gate of the first transistor receives a scan signal, and a source of the first transistor is connected to the second switch module;

a gate of the second transistor is connected to a drain of the first transistor, a source of the second transistor is connected to the first switch module, and a drain of the second transistor is connected to the driving voltage;

an end of the capacitance is connected to the drain of the first transistor and the gate of the second transistor, and another end of the capacitance is connected to the source of the second transistor and the switch module;

the comparison module comprises a voltage comparator, an in-phase input end of the voltage comparator is connected to the driving voltage, a reverse phase input end of the voltage comparator is connected to the reference voltage, and an output end of the voltage comparator is connected to the selection module;

the selection module comprises a third transistor and a fourth transistor, a gate of the third transistor is connected to an output end of the voltage comparator, a source of the third transistor is connected to the negative low voltage, and a drain of the third transistor is connected to the first switch module and the second switch module; and a gate of the fourth transistor is connected to the output end of the voltage comparator, a source of the fourth transistor is connected to the positive high voltage, and a drain of the fourth transistor is connected to the first switch module and the second switch module.

7. The display panel according to claim 6, wherein the first switch module comprises: a fifth transistor, wherein a gate of the fifth transistor is connected to the drain of the third transistor and the drain of the fourth transistor, a source of the fifth transistor is connected to the source of the second transistor and another end of the capacitor, and a drain of the fifth transistor is connected to an anode end of the light emitting device.

* * * * *